(12) United States Patent
Hansen

(10) Patent No.: US 11,787,616 B2
(45) Date of Patent: Oct. 17, 2023

(54) FLEXIBLE LAMINATE WITH IMPROVED INTEGRATED PRESSURE-RELEASE VALVE

(71) Applicant: AMCOR FLEXIBLES DENMARK APS, Horsens (DK)

(72) Inventor: Peter Hansen, Ve-Jle Oest (DK)

(73) Assignee: Amcor Flexibles Denmark ApS, Horsens (DK)

( * ) Notice: Subject to any disclaimer, the term of this patent is extended or adjusted under 35 U.S.C. 154(b) by 305 days.

(21) Appl. No.: 16/767,560

(22) PCT Filed: Nov. 22, 2018

(86) PCT No.: PCT/EP2018/082152
§ 371 (c)(1),
(2) Date: May 27, 2020

(87) PCT Pub. No.: WO2019/105830
PCT Pub. Date: Jun. 6, 2019

(65) Prior Publication Data
US 2020/0369450 A1    Nov. 26, 2020

(30) Foreign Application Priority Data

Nov. 28, 2017    (EP) .................................... 17203966

(51) Int. Cl.
*B65D 77/00* (2006.01)
*B65D 77/22* (2006.01)
*B32B 27/08* (2006.01)
*B32B 27/30* (2006.01)
*B32B 27/32* (2006.01)
(Continued)

(52) U.S. Cl.
CPC ............ *B65D 77/225* (2013.01); *B32B 27/08* (2013.01); *B32B 27/306* (2013.01); *B32B 27/32* (2013.01); *B65D 33/01* (2013.01); *F16K 15/14* (2013.01); *B32B 2307/7244* (2013.01); *B32B 2553/00* (2013.01); *B65D 2205/02* (2013.01)

(58) Field of Classification Search
CPC ...... B65D 77/225; B65D 27/08; B65D 33/01; B65D 2205/02; B32B 27/08; F16K 15/14
USPC ........................................................ 428/35.7
See application file for complete search history.

(56) References Cited

U.S. PATENT DOCUMENTS

| 4,134,535 A | * | 1/1979 | Barthels ............... B65D 77/225 137/251.1 |
| 5,263,777 A | * | 11/1993 | Domke ................ B65D 77/225 426/118 |
| 5,326,176 A | | 7/1994 | Domke |

(Continued)

FOREIGN PATENT DOCUMENTS

| EP | 0144011 B1 | 9/1988 |
| EP | 0559598 B1 | 6/1996 |

(Continued)

*Primary Examiner* — Peter N Helvey

(57) ABSTRACT

Flexible multilayer laminates may have an improved integrated, one-way pressure-release valve for use in a sealed container for packing gas-producing products. The pressure-release valve is partly disconnected from the rest of the laminate, forming an inflatable outlet tube with at least one large outlet opening and lifting off from the laminate under increased pressure in the pack. The one-way pressure-release valve allows for pressure-release at low minimum opening pressure in a reliable and reproducible way.

19 Claims, 11 Drawing Sheets

(51) Int. Cl.
    *B65D 33/01*         (2006.01)
    *F16K 15/14*         (2006.01)

(56) References Cited

U.S. PATENT DOCUMENTS

| | | | |
|---|---|---|---|
| 7,527,840 B2 | 5/2009 | Zeik | |
| 7,892,390 B2 * | 2/2011 | Zeik | B32B 27/08 156/289 |
| 8,557,357 B2 | 10/2013 | Lykke et al. | |
| 9,868,575 B2 * | 1/2018 | Hansen | B32B 3/18 |
| 9,944,447 B2 * | 4/2018 | Hansen | B65D 77/225 |
| 9,988,190 B2 * | 6/2018 | Berg, Jr. | B65D 75/008 |
| 10,138,024 B2 * | 11/2018 | Pettis | B32B 7/00 |
| 10,281,050 B2 * | 5/2019 | Branyon | B29C 66/43 |
| 10,442,589 B2 * | 10/2019 | Branyon | B32B 27/365 |
| 11,112,017 B2 * | 9/2021 | Taylor | F16K 7/14 |
| 2011/0284536 A1 | 11/2011 | Walters | |

FOREIGN PATENT DOCUMENTS

| | | | |
|---|---|---|---|
| EP | 3239069 A1 | 11/2017 | |
| JP | 61008542 U1 | 1/1986 | |
| JP | 2009106173 A | 5/2009 | |
| WO | 2013162636 A1 | 10/2013 | |
| WO | 2014055736 A1 | 4/2014 | |
| WO | 2016030071 A1 | 3/2016 | |
| WO | WO 2016/030071 | * | 3/2016 |

* cited by examiner

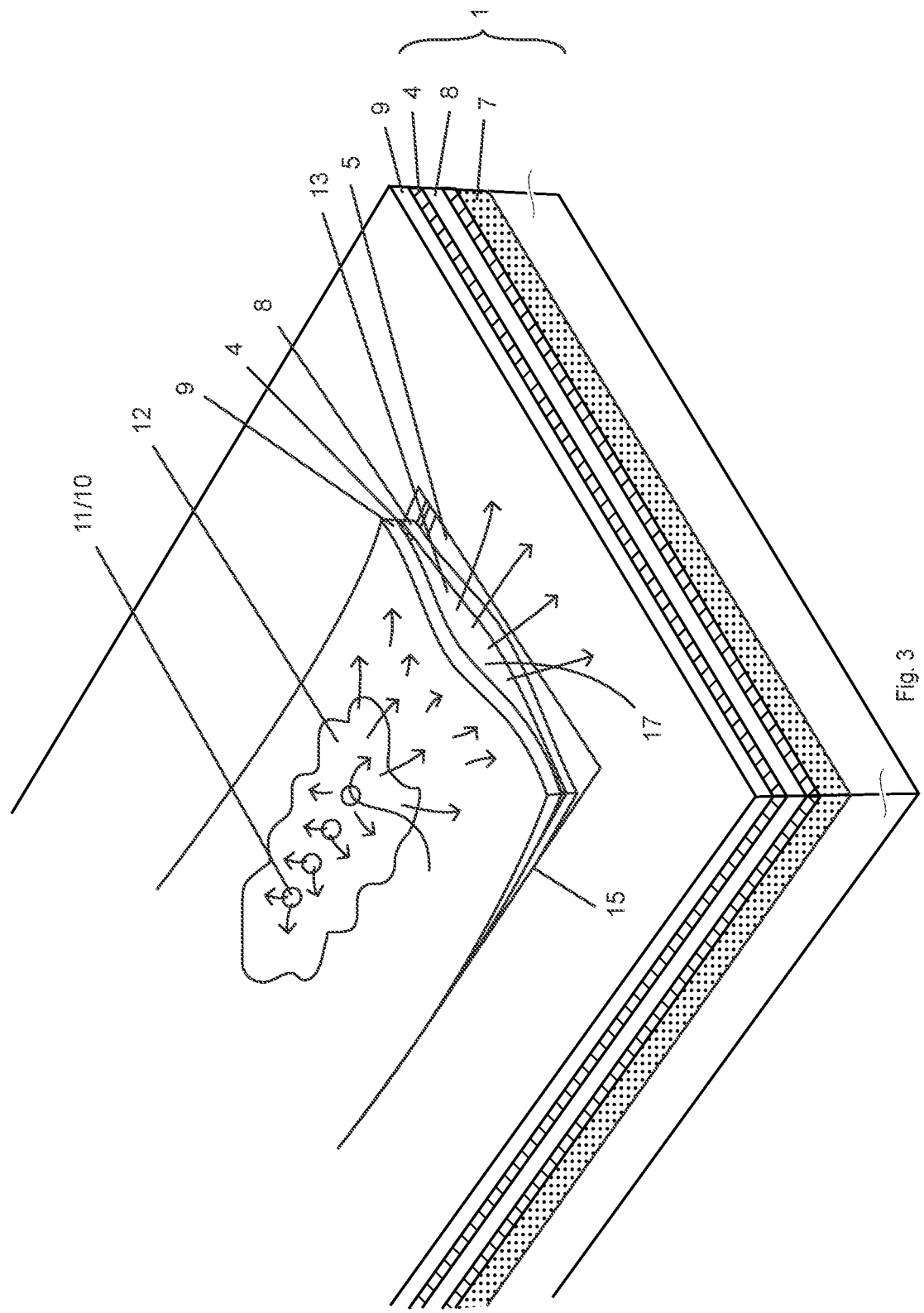

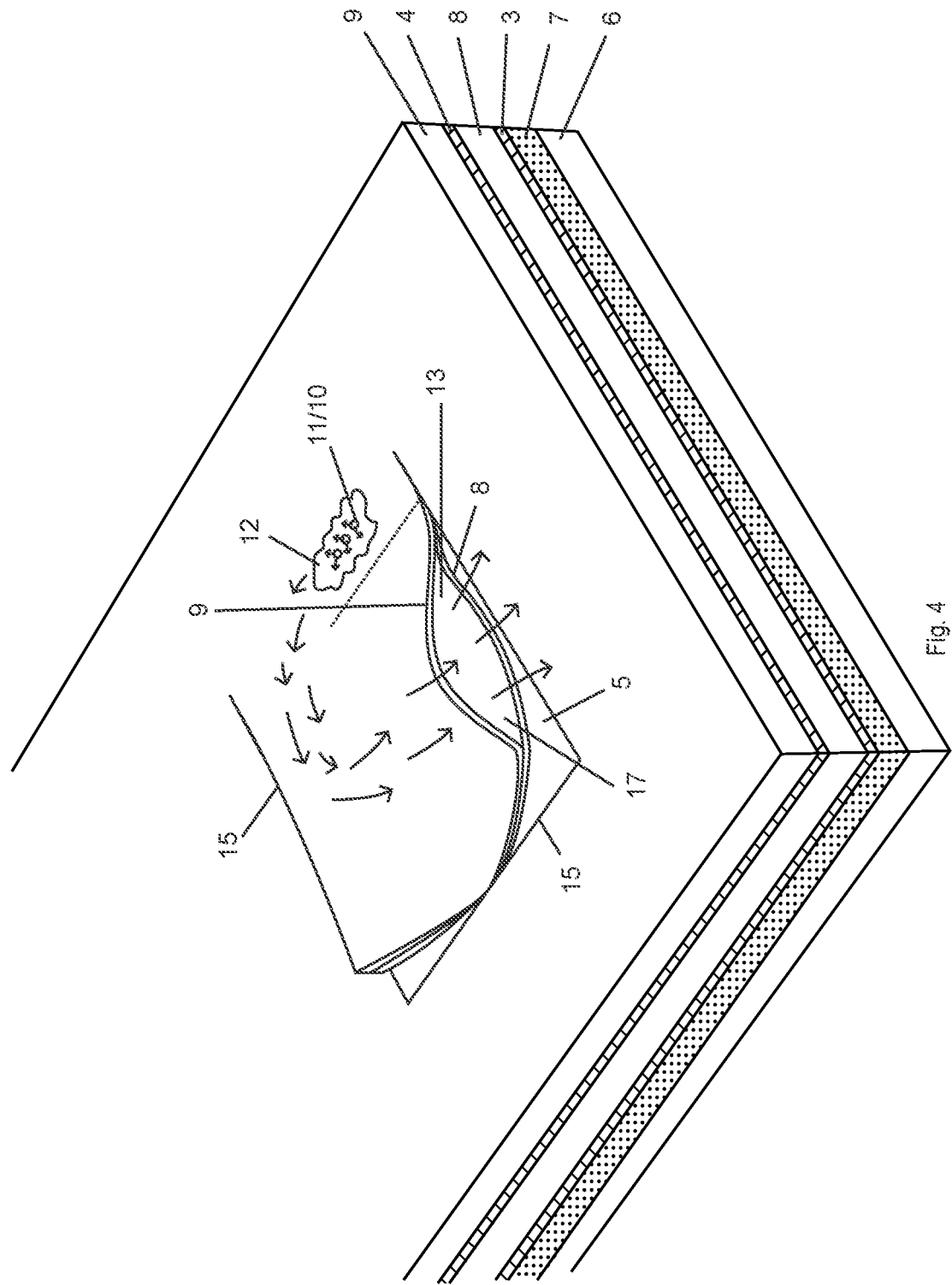

FLEXIBLE LAMINATE WITH IMPROVED INTEGRATED PRESSURE-RELEASE VALVE

FIELD

The present disclosure is related to flexible multilayer laminates having a series of integrated, one-way pressure-release valves with a cavity comprising liquid to be used in a sealed container for packing gas-producing products.

INTRODUCTION

In today's market, many products are packaged in sealed containers using vacuum packing because the product is oxygen-sensitive and will degrade when exposed to oxygen. Common examples of oxygen-sensitive products that use a vacuum-packed container include coffee and dairy products.

Products containing gases or producing off-gasses for a period of time, such as coffee after roasting, must be degassed before they are packed. If packed before or during the degassing period, the generated gasses can increase the internal pressure of the package so that the sealed package may deform or even burst. Additional facilities are thus required for degassing the product before it is packed. For example, six to eight hours may be needed for degassing ground coffee so that it can be conventionally packed. Besides the fact that degassing coffee before packing is not favorable from an economical point of view, it will also influence the quality of the coffee.

In order to skip the degassing step and to preserve the quality of the coffee, the use of a one-way valve incorporated in the sealed package structure has been proposed. An advantage of packaging with a one-way valve is that overpressure issues can be avoided since the valve will vent away positive pressure differentials. In case of a negative pressure difference—the internal pressure is lower than the external pressure—the one-way valve that prevents the back flow of air into the package must be able to withstand this internal vacuum without failing to prevent the ingress of oxygen that may potentially damage the contents. By means of a venting valve, the deficiencies of vacuum packing can be avoided.

One-way valves integrated in the flexible package structure have already been the subject matter of a certain number of patents.

EP 0 144 011 B1 (Raackmanns Fabriker A/S '83) discloses a laminate for the manufacture of a packing with an integrated valve created by laminating the outer layer of the laminate to the adjacent, internally positioned layer, a limited area being however not laminated and communicating with the surroundings of the finished packing, while a perforation is provided within the non-laminated area through the remaining inner laminate layer, said perforation being placed to form an open connection between the interior and the non-laminated area of the finished packing.

U.S. Pat. Nos. 5,263,777 and 5,326,176 (Robert Bosch GmbH '91) disclose an add-on one-way valve comprising adhesive strips adhering a thin flexible membrane to the package wall. The thick peripheral part of the adhesive strips has the effect that one wall of an adjacent package in a collective package is supported on the raised peripheral zones of the membrane, which act as spacers, so that if overpressure occurs in the package, the adhesive-free center zone can freely bulge outward, forming a channel, thus making the overpressure valve functional.

EP 0 559 598 B1 (Danapak Holding A/S '92) discloses a foil comprising a valve for the packing of gas-emitting products, which foil consists of an inner layer and of an outer layer in which perforations are made, the perforations of the one layer being staggered in relation to the perforations of the other layer, the inner layer and the outer layer being glued together substantially over the entire foil with the exception of limited sections that are left un-laminated for the formation of a pocket between the layers and where the perforations extend into said pocket.

U.S. Pat. No. 8,557,357 (Amcor Flexibles Transpac B.V.B.A '09) discloses an integral, normally closed pressure-release valve including a first inner film having at least one inlet opening, and a second outer film covering the inlet opening in the first inner film and being bonded to the first inner film to form a channel portion between the first inner film and the second outer film, said channel communicating with the surroundings of the package through at least one outlet opening spaced apart from the inlet opening. The pressure-release valve further comprises a liquid and solid spacer means provided in the channel portion proximate to the inlet opening.

U.S. Pat. No. 7,527,840 (The Folger Coffee Company '04) discloses a multi-layered flexible laminate having an integrated pressure-release valve comprising a first laminate having at least one inlet channel and a second laminate having at least one outlet channel, the first and second laminates at least partially bonded to one another about an un-bonded valve region having open and closed orientations and having a liquid film disposed therein and particles mixed with the liquid film at a location proximate to the inlet channel wherein the inlet and outlet channels permit gaseous communication in one direction.

U.S. Pat. No. 7,892,390 (The Folger Coffee Company '04) discloses a process for making a laminate having an integrated pressure-release valve.

WO 2013/162636 (Avery Dennison Corporation '12) discloses a multi-layer one-way valve including a first layer having at least one opening formed therein, a second layer having at least one opening formed therein and a third layer. The first and the second layers are joined together such that at least one channel is defined there between, and the second and the third layers are joined together such that at least one second channel is defined there between. Additionally, an amount of flowable liquid is deposited in the first channel between the first and second openings.

WO 2014/055736 (CCL Label, Inc. '12) discloses a one-way valve including first and second layers joined together such that at least one channel is defined there between, which channel selectively permits gas flow from the first opening out of the valve. In operation, the valve selectively opens to permit gas flow through the channel in response to a pressure differential on opposing sides of the valve.

WO 2016/030071 (Amcor Flexibles) discloses a flexible multilayer laminate for forming a packaging of gas-releasing products, said laminate having an integrated pressure-release valve having open and closed orientations and having a liquid film disposed therein, the liquid film optionally comprising spacer means.

The one-way pressure-release valves as disclosed in prior-art documents suffer at least from one of the following shortcomings with regard to:
  theft reliability during the life cycle of the packaging, i.e. venting away positive pressure differentials and preventing the ingress of air because of negative pressure differentials;
  their output capacity, which is insufficient for the packaging of products with an important off-gassing flow rate, such as for example ground coffee being packed immediately after being ground, i.e during the initial phase of its degassing; and oil over floating in the valve area during the reeling of the laminate.

These shortcomings are in general attributed to the design of said one-way valve which must be construed as an optimum relation between the gas release capacity and a suitable chamber containing liquid to close the channel between inside and outside the pack.

SUMMARY

The present disclosure aims to provide a flexible laminate including integral, one-way pressure-release valves with a cavity comprising liquid exhibiting reliable and reproducible low opening pressure and high output capacity, allowing the use of a reduced quantity of oil and avoiding in this way an over float of oil during the reeling of the laminate.

A further aim of the present disclosure is to provide a method for the manufacturing of said flexible laminate including said integral, one-way pressure-release valve with gas-release chamber. The present disclosure discloses a flexible multilayer laminate for forming a packaging of gas-releasing products, said laminate comprising an integrated pressure-release valve with a cavity, said valve having open and closed orientations and comprising a liquid disposed therein, said flexible multilayer laminate comprising:

a laminate comprising a first oriented polymer layer with integrated cavity, comprising liquid, said oriented polymer layer being sealed by a first adhesive pattern on an underlying layer, said underlying layer comprising a seal layer, said first adhesive pattern comprising first adhesive-free regions located on at least both sides of, or around at least one inlet perforation and a second perforation-free oriented polymer layer partly bonded to the first oriented polymer layer via a second adhesive pattern, the first and second oriented polymer layers forming, once bonded in register, an inflatable outlet tube, said inflatable tube being partially disconnected from the rest of said laminate by a surrounding outer score line allowing the tube to lift off from the first laminate under increased pressure in the pack;

wherein the at least one inlet perforation and the inflatable outlet tube preferentially permit gaseous communication in one direction, the gas entering through the at least one perforation, into the cavity comprising liquid travelling through the liquid and exiting through the inflatable tube.

Preferred embodiments disclose one or more of the following features:

the surrounding outer score line is interrupted at least once at a location corresponding to the outlet opening (s) of the inflatable outlet tube, and an additional, interrupted score line is provided adjacently parallel to the interrupted part of score line, the interruptions of both score lines being alternately positioned;

the inflatable outlet tube has a shape selected from the group consisting of an "L"-shape, an "U"-shape and an intermediate "L/U" shape wherein the perforations with cavity comprising liquid are shifted away from outlet opening;

the opening pressure of the pressure-release valve is lower the 1500 Pa, preferably lower than 1000 Pa, more preferably lower than 800 Pa to achieve easy opening and high output of the valve;

the first and second oriented polymer layers are independently selected from the group consisting of oriented polyester, oriented polypropylene and oriented polyamide;

the first and/or second oriented polymer layer(s) comprise(s) a barrier such as a metallized layer, an aluminum layer, a silicon oxide or aluminum oxide layer or an ethylene vinyl alcohol copolymer (EVOH) coating;

the liquid is selected from the group consisting of silicon oil, hydrocarbon oil, vegetable oil and water;

the liquid has a dynamic viscosity, at room temperature, comprised between 1 cP and 15000 cP, preferably between 500 cP and 1300 cP;

the off-gassing flow capacity of the valve is higher than 5 cm$^3$/min, preferably higher than 10 cm$^3$/min, more preferably higher than 15 cm$^3$/min, and most preferably higher than 20 cm$^3$/min;

flexible multilayer laminate comprising a plurality of integrated pressure-release valves;

up to 12, preferably up to 15, more preferably up to 20 integrated pressure-release valves are positioned next to each other in the width of the laminate i.e. in the cross direction of the laminate, as represented in FIG. 12.

The present disclosure also discloses a packaging comprising the flexible multilayer laminate.

The present disclosure further discloses a method for making the flexible multilayer laminate, said laminate having an integrated pressure-release valve, said method comprising the steps of:

a) providing a first part of the laminate comprising a seal layer;

b) applying a first adhesive pattern on said first part of the laminate, said adhesive pattern comprising one or more adhesive-free regions of various shapes;

c) joining a first oriented polymer layer to the first part of the laminate to form the second part of the laminate;

d) perforating said second part of the laminate in the area surrounded by the adhesive-free region(s);

e) scoring a cavity in the first oriented polymer layer and the first adhesive layer at the location of each perforation;

f) applying a second adhesive pattern on the second part of the laminate;

g) applying a liquid on the second part of the laminate at the location surrounding the perforations;

h) joining a second oriented polymer layer to the first oriented polymer layer using a second adhesive pattern;

i) partly separating the first oriented polymer layer from the surrounding multilayer laminate by scoring means to form an inflatable outlet tube when the second oriented polymer layer is a patch.

BRIEF DESCRIPTION OF THE DRAWINGS

FIG. 3 represents a top view of the valve region releasing gas via one outlet opening, through the straight inflatable outlet tubing once a minimum opening pressure is reached.

FIG. 4 represents a top view of the valve region releasing gas via one outlet opening, through the inflatable outlet tubing in the form of an intermediate "L/U" once a minimum opening pressure is reached.

Figure 1:
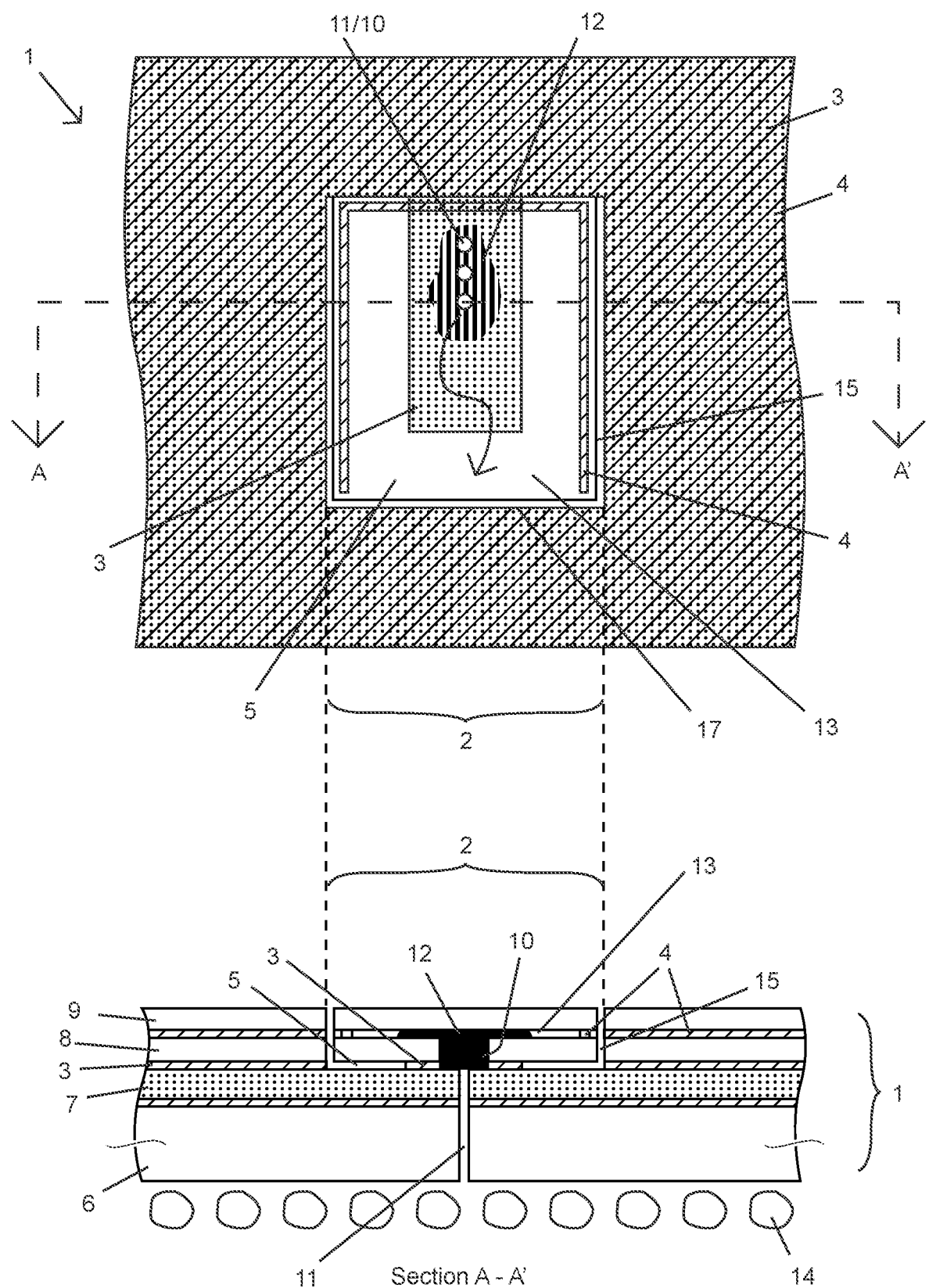
FIG. 1 represents a top view and a cross-section view of the flexible multilayer laminate according to the disclosure with straight inflatable outlet tube, wherein the first adhesive-free region is "⊔"-shaped.

KEY 1. flexible laminate
2. one-way pressure-release valve
3. first adhesive pattern
4. second adhesive pattern
5. first adhesive-free region
6. seal layer
7. barrier layer
8. first oriented polymer layer
9. second oriented polymer layer
10. cavity comprising liquid
11. perforation
12. liquid
13. inflatable outlet tube
14. gas
15. score line
16. additional interrupted score line
17. outlet opening of the inflatable outlet tube
18. oil reservoir
19. laminate reel comprising a plurality of pressure-release valves

DETAILED DESCRIPTION

The present disclosure is related to a flexible laminate having an integrated, one-way pressure-release valve. The laminate may be used in conjunction with a sealed container used to pack products such as those containing gasses or generating off-gasses, or those transported through changes in altitude and temperature. Although the laminate may be used in conjunction with a variety of different containers and placed in a variety of different ways to achieve the desired effect, it is preferably used in conjunction with containers made from plastics, composites and the like. Indeed, the present laminate may even be bonded to itself to form a pouch or bag. Regardless of how the laminate of the present disclosure is used, the structure of the integrated valve provides pressure-release in a preferred direction.

The one-way pressure-release valve of the present disclosure is integrated within a laminate, the valve functioning in one instance to release pressure built up within the container due to such factors as off-gassing of a product therein, increase in altitude and increase in temperature. Moreover, the pressure-release valve of the present disclosure functions in another instance to prevent air from entering the container when the internal pressure of the container is less than the external pressure, which may result from the adsorption, absorption, or reaction of gasses generated by the product within the container, a decreased temperature or a decreased altitude. Thus, even though the internal pressure of the container may increase or decrease in relation to the external atmosphere, the present valve adapts accordingly, thereby preserving the integrity of the seal, the container and the product therein.

Figure 13:
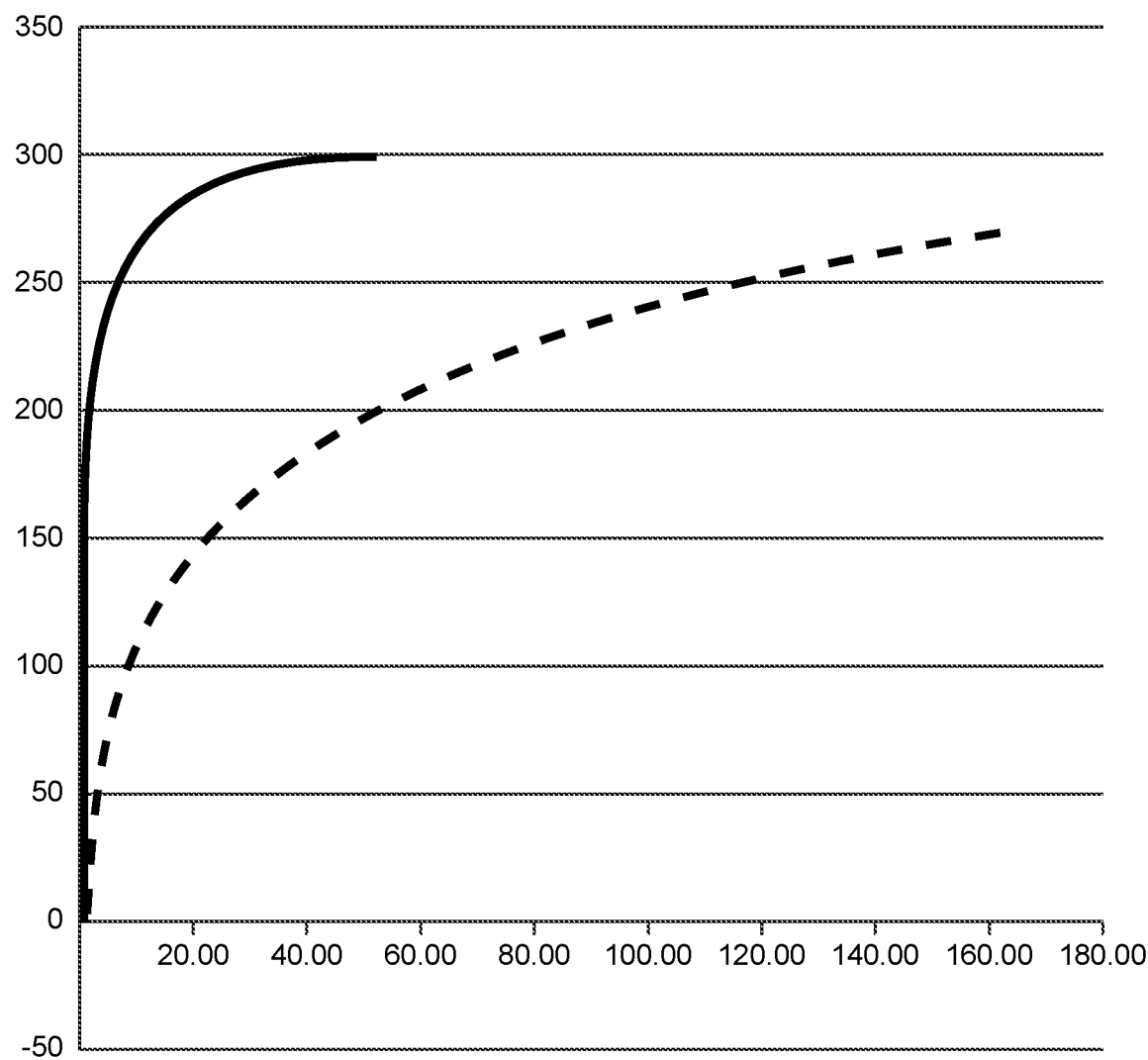
FIG. 13 represents a graph showing coffee off-gassing as a function of time, wherein the abscissa represents the off-gassing period in hours and the ordinate represents the number of millilitres of off-gassed carbon dioxide. The continuous line stands for ground coffee off-gassing while the dashed line stands for the off-gassing of coffee beans.

The one-way pressure-release valve of the present disclosure allows for the packaging of products characterized by an important off-gassing flow rate; the one-way pressure-release valve of the present disclosure thus allows for packing ground coffee immediately after grinding, without intermediate storage, at a moment where the degassing of carbon dioxide is important (see FIG. 13).

The one-way pressure-release valve of the present disclosure is characterized by a reliable and reproducible functioning at low opening pressure throughout the entire life cycle of the packaging.

Referring to the embodiment illustrated in FIGS. 1 to 5, the flexible laminate 1 of the present disclosure with the valve 2 comprises an underlying layer with a seal layer 6 and a barrier layer 7, and a first oriented polymer layer 8 which is laminated to said underlying layer substantially over the entire extension of the laminate using a first adhesive pattern 3 comprising a first adhesive-free region 5.

The first adhesive-free region 5 can be of any shape, but preferably is "O"-shaped (circular), "□"-shaped (square-frame), " ⌷ "-shaped (rectangular-frame), "II"-shaped (parallel strips) or "⊔"-shaped (U-type).

At least one perforation 11 is provided through the first oriented polymer layer 8, the first adhesive pattern 3 and the underlying layer, comprising the seal layer 6 and the barrier layer 7, at such a location that the at least one perforation 11 is completely surrounded by the adhesive and has the adhesive-free region 5 located at least on both of its sides.

The at least one perforation 11 may be in the form of slits, holes and the like. In order to prevent the product to be packed from entering the inflatable outlet tube 13, the at least one perforation has a diameter smaller than most of the products to be packed. When the product to be packed is granular or powder material, the diameter of the perforation is smaller than most of the particles of said product. When the product to be packed is ground coffee, the diameter of the at least one perforation is smaller than 200 µm, preferably smaller than 150 µm. However? the diameter of the at least one perforation is between 50 µm and 500 µm.

The at least one perforation passes into a cavity 10 at the contact surface between the barrier layer 7 and the first adhesive pattern 3, said cavities 10 being situated in the first adhesive pattern 3 and the first oriented polymer layer 8. The diameter of the cavity 10 is at least 50% larger, preferably at least 100% larger, more preferably at least 150% larger, most preferably at least 200% larger or even at least 300% larger than the diameter of the perforation 11.

The valve region 2 may be provided with at least two slightly interspaced perforations 11 comprising a cavity 10, e.g. being interspaced by 0.5 to 2.0 mm, especially 0.5 to 1.0 mm. Further, the valve region 2 may be provided with more than two perforations 11 comprising a cavity 10, such as five slightly interspaced perforations 11 comprising a cavity 10. Optionally, the valve region 2 may be provided with nine or more slightly interspaced perforations 11 comprising a cavity 10 which may be arranged in different patterns.

By using an increased number of perforations with a cavity, the opening pressure and/or the opening time of the valve can be reduced.

A second oriented polymer layer 9 is then laminated to the first oriented polymer layer 8 via the second adhesive pattern 4, forming an inflatable outlet tube 13 in the area corresponding to the adhesive-free region 5, the adhesive-free region 5 allowing said inflatable outlet tube 13 to be partially disconnected from the rest of the flexible laminate 1.

The adhesive-free zone(s) of the second adhesive pattern 4 allow the formation of the inflatable outlet tube 13 and the positioning of liquid 12 in between the first 8 and the second 9 oriented polymer layers, predominantly located in the cavities 10 present in the first adhesive layer 3 and the first oriented polymer layer 8.

The inflatable outlet tube may have any shape.

Figure 2:
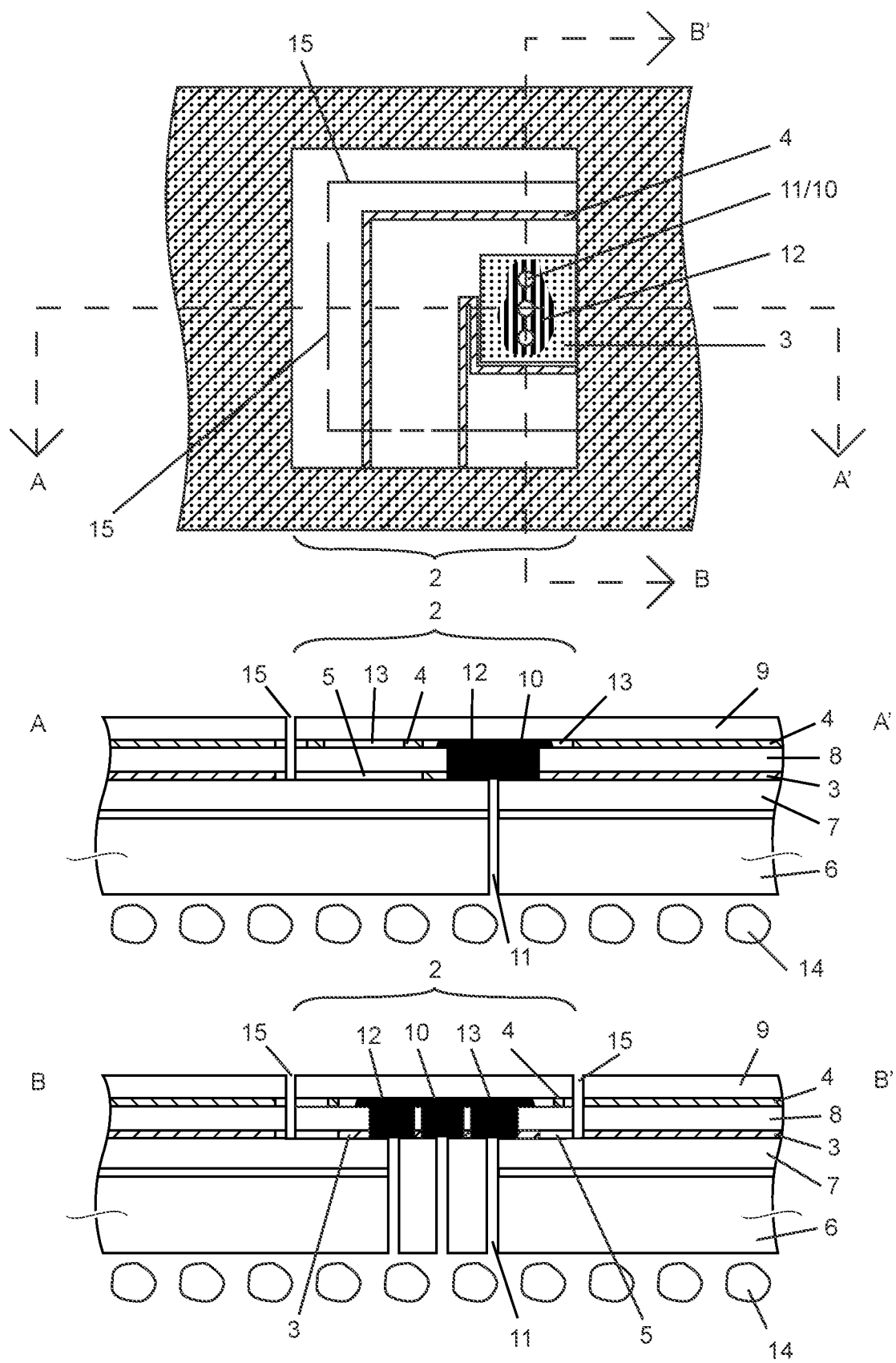
FIG. 2 represents a top view and a cross-section view of the flexible multilayer laminate according to the disclosure with an inflatable outlet tube in the form of an intermediate "L/U", wherein the first adhesive-free region is "⊔"-shaped.

Preferably, the second adhesive pattern 4 is built so as to obtain an inflatable outlet tube 13 having an L-shape (FIG. 9), a ⊔-shape (FIG. 8) or any intermediate thereof (FIG. 2)

The inventors have surprisingly found that the cavities 10 allow for the use of a reduced amount of liquid 12, down to 50%, relative to the amount of liquid 12 required in the absence of said cavities. The reduced amount of liquid, mainly situated in the cavities, allows for a reduced minimum opening pressure while preserving or even improving the barrier preventing the ingress of air from outside to inside the container.

Positioning the at least one perforation 11 comprising a cavity 10 and outlet opening 17 in such a way as to be offset from one another allows the present valve 2 to preferentially function in one direction, i.e. from the inside of a container to the outside of a container.

Positioning the at least one perforation 11 comprising a cavity 10, shifted away from the outlet opening 17, such as is the case for an inflatable outlet tube 13 having an L-shape, a ⊔-shape or any intermediate thereof, besides further reducing the minimum opening pressure and improving the barrier preventing the ingress of air, additionally guarantees that liquid 12 does not leak out of the outlet opening 17, during the reeling of the laminate.

Gas 14 generated inside a sealed packaging can traverse the at least one perforation 11 into the liquid film generated by the liquid 12 substantially pushed out of the cavity 10 and then continue through the at least one outlet opening 17 of the inflatable tube 13; the reverse movement of gas from the outside to the inside of a sealed packaging being impossible.

Liquid 12 can be any fluid and may comprise, for example, silicon oil, hydrocarbon oil, vegetable oil, water or the like, variants of which would be known to those skilled in the art. The liquid film is characterized by a dynamic viscosity at room temperature comprised between 1 cP and 15000 cP, preferably between 500 and 13000 cP.

The amount of liquid deposited between the first 8 and second 9 oriented polymer layers is in the range comprised between 0.1 µl and 10 µl. It should be noted that liquid 12 mainly fills up the cavities 10 so that enough liquid to form a liquid film, guaranteeing the functionality of the present valve.

The liquid 12 thus provides communication of gas 14 through the at least one perforation 11 and the at least one outlet opening 17 of the inflatable outlet tube 13 in one direction only, i.e. from the inside to the outside of the packaging.

Figure 5A:
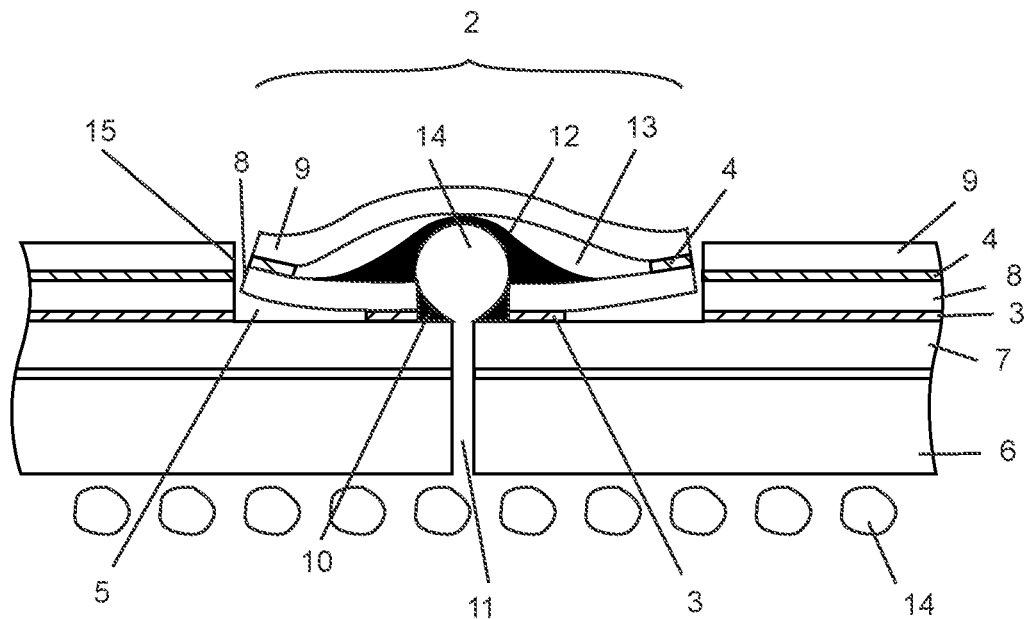
FIG. 5 represents a cross-section view of the valve region releasing gas through the inflatable outlet tubing, once a minimum opening pressure is reached, for FIG. 5a a straight inflatable outlet tube and FIG. 5b an inflatable outlet tube in the form of an intermediate "L/U"
Figure 5B:
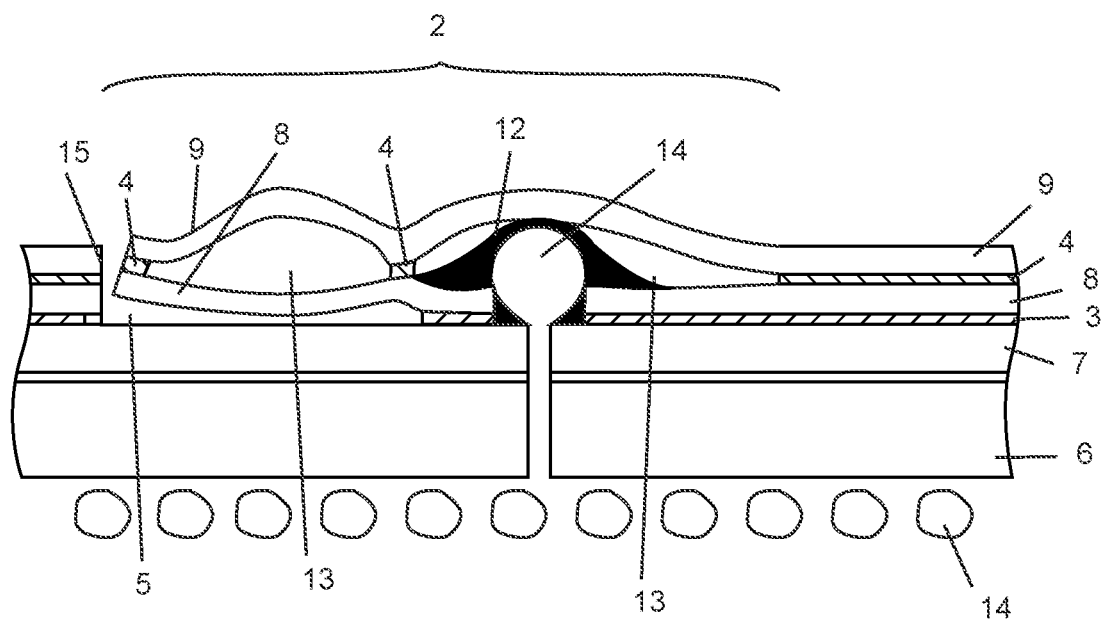

The open orientation of the inflatable outlet tube 13 is illustrated in FIGS. 3 to 5 and generally occurs at an internal pressure of less than 1500 Pa, preferably less than 1000 Pa, more preferably less than 800 Pa. The pressure needed to open the valve region 2 is based on several factors, including, but not limited to, shape of the inflatable outlet tube 13, number and size of perforations 11, number and size of the cavities 10, number and size of outlet openings 17 in relation to the size of the container, viscosity of the liquid, off-gassing of the packed product, and the like.

The distension of un-bonded region at the location of the at least one perforation 11 with cavity 10 permits gas 14 to more easily traverse through the liquid 12, disposed as a film around the cavities, through the outlet opening 17. Once gas 14 has traversed the inflatable outlet tube 13, the adhesiveness of liquid film self-compresses the second oriented polymer layer 9 to first oriented polymer layer 8, thereby halting gaseous communication within the inflatable outlet tube 13 until gas 14 builds again and begins traversing through the at least one perforation 11.

Self-compression by the adhesiveness of liquid film generally occurs at a pressure of less than about 500 Pa, preferably less than about 200 Pa. Moreover, if any gas attempts to enter through outlet opening 17, it is prevented from doing so because liquid film disposed around the cavities acts as an adhesive that effectively seals the valve region 2 and prevents the distention of the first oriented polymer layer 8 and/or the second oriented polymer layer 9 that is necessary for gaseous communication within the valve region 2 to occur.

Thus, having at least one perforation 11 with cavity 10, surrounded by liquid film originating from liquid 12, and at least one outlet opening 17 placed so as to be offset from one another within valve region 2, and preferably shifted away via an inflatable outlet tube 13 having an L-shape, a ⊔-shape or any intermediate thereof, effectively allows the present pressure-release valve to function in a preferred direction.

The one-way outlet valve 2 is represented in FIG. 1 and FIG. 2 in a closed position.

The one-way outlet valve 2 of the present disclosure, in open position, is illustrated in FIGS. 3 to 5. The partial disconnection of said valve 2 from the flexible laminate 1 implies that the functioning of said valve 2 is independent of the history or the current state of the rest of the flexible laminate 1. In contrast to the one-way pressure-release valves as disclosed in the prior art, stresses in the laminate 1 due for example to pressure differentials and/or mechanical deformation will not affect the proper functioning of the valve 2 during the life of the derived packaging. Upon functioning, valve 2 lifts up from laminate 1, which results in an increased output capacity of said valve.

Returning to FIG. 1, the one-way pressure-release valve has a rectangular shape and is obtained from laminating the first oriented polymer layer 8 to the underlying seal layer 6 and barrier layer 7, substantially over the entire extension of the laminate using a first adhesive pattern 3, comprising a "⊔"-shaped (U-type) first adhesive-free region 5.

A plurality of perforations 11 is provided through the first oriented polymer layer 8, the first adhesive pattern 3, the underlying barrier layer 7 and seal layer 6 at the location where the plurality of perforations 11 is completely surrounded by adhesive and has the adhesive-free region 5 located along three of its sides. At the location of the perforations 11, preferably at the location of each perforation 11, a cavity 10 is provided through the first oriented polymer layer 8 and the first adhesive layer 3.

A second oriented polymer layer 9 is then laminated to the first oriented polymer layer 8 over the entire extension of the laminate via a second adhesive pattern 4 forming the inflatable tube 13 in the area corresponding to the adhesive-free region 5. The inflatable outlet tube 13 comprises one outlet opening 17.

The adhesive-free region 5 allows said inflatable outlet tube to be partially disconnected from the rest of the laminate 1, allowing said outlet tube 13 to lift off from the laminate 1 under increased pressure in the packing.

While flexible laminate 1 may comprise any number of layers, the overall thickness of the laminate should be from about 10 μm to about 200 μm, preferably from about 20 μm to about 170 μm, more preferably from about 30 μm to about 150 μm.

Figure 6:
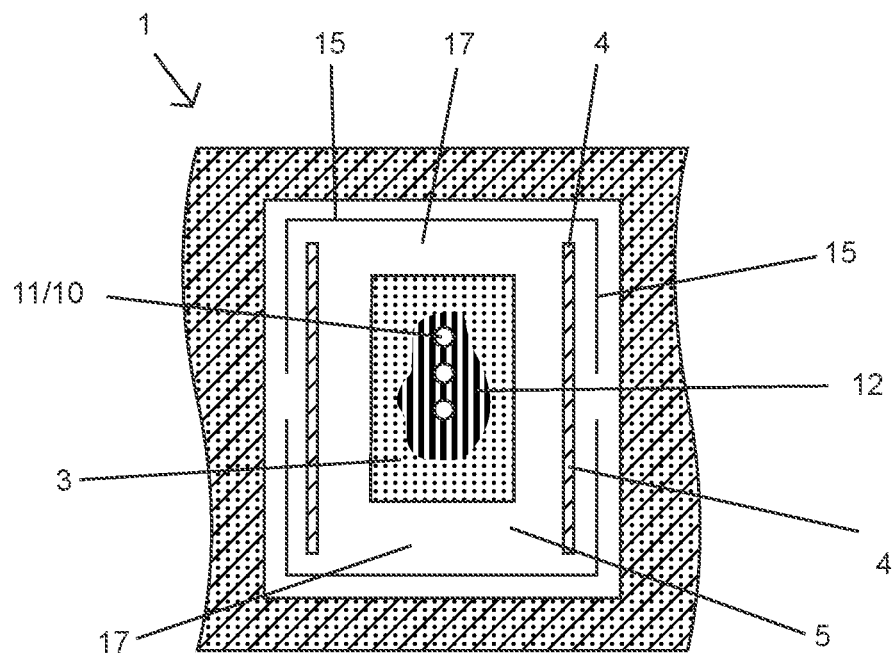
FIG. 6 represents a top view of the flexible multilayer laminate comprising the valve region, wherein the first adhesive-free region is " ⊔ "-shaped and the inflatable outlet tube is a straight outlet tube with two outlet openings.
Figure 11:
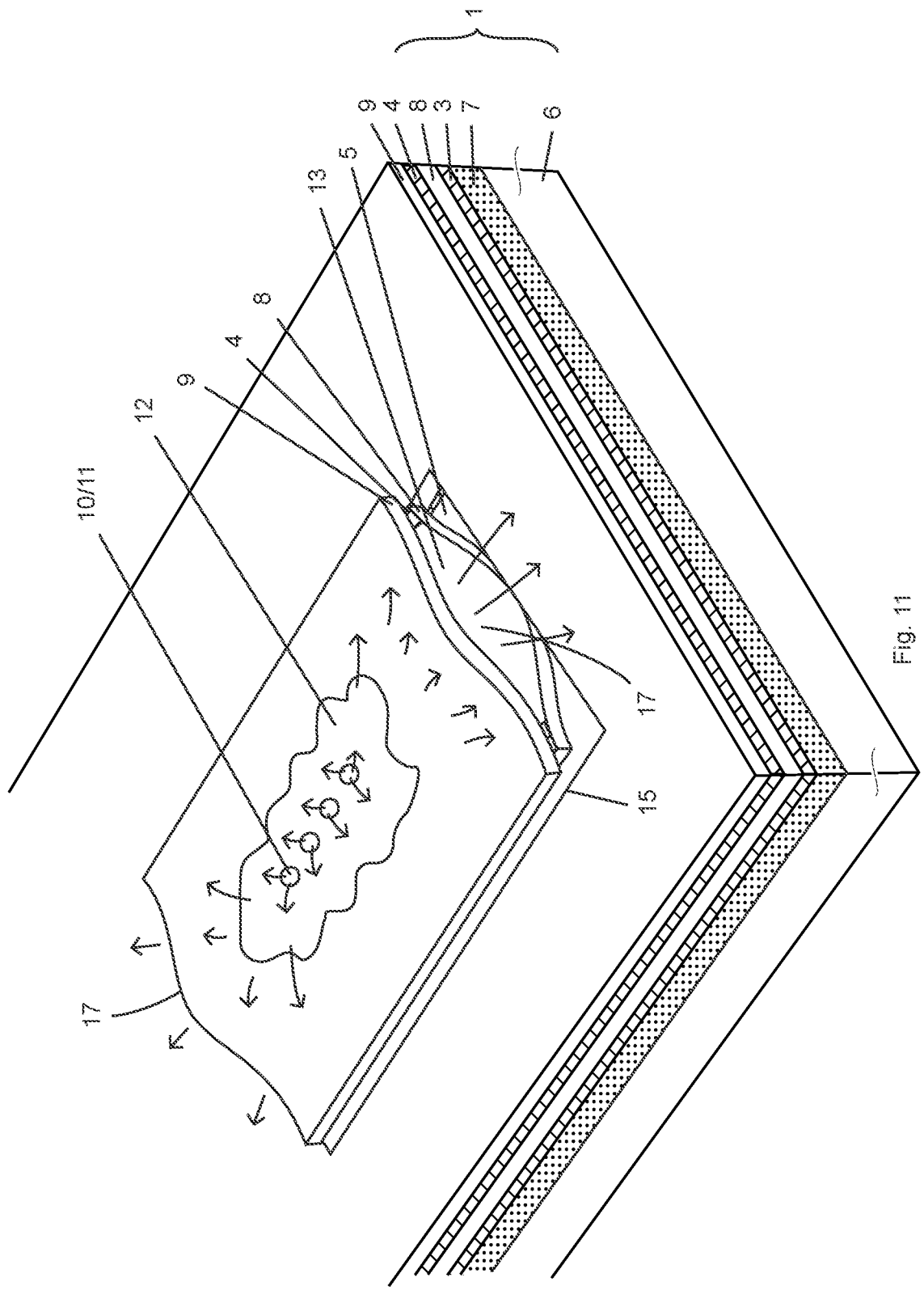
FIG. 11 represents a top view of the valve region releasing gas via two outlet openings through the inflatable outlet tubing, once a minimum opening pressure is reached.
Figure 12:
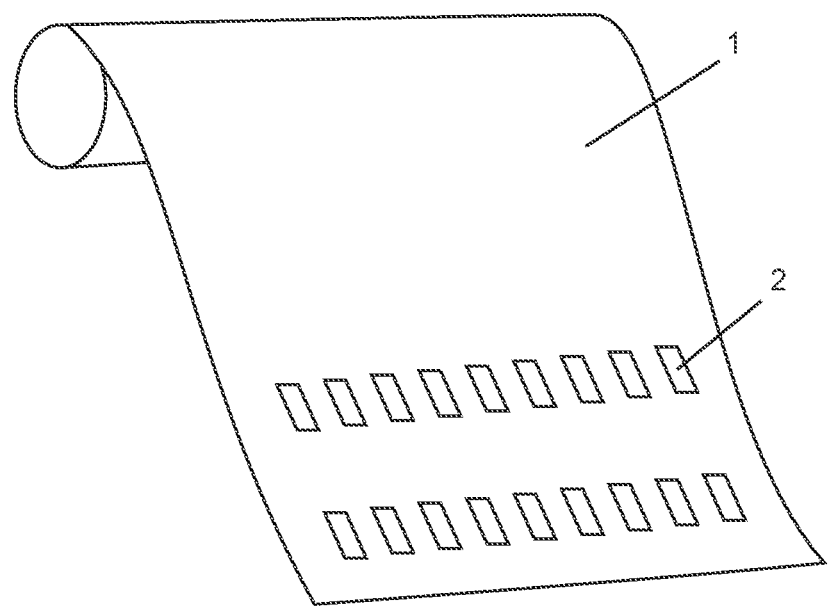
FIG. 12 represents a reel of flexible multilayer laminate comprising a plurality of integrated pressure-release valves.

Referring to another exemplary embodiment of the present disclosure, as illustrated in FIG. 6, the first adhesive-free region 5 is rectangular-frame shaped. A second oriented polymer layer 9 is then laminated to the first oriented polymer layer 8 over the entire extension of the laminate via a second adhesive pattern 4, with the exception of the location corresponding to adhesive-free region 5, where the second adhesive pattern 4 is limited to two parallel adhesive comprising zones applied on the first oriented polymer layer 8 on two edges within the location corresponding to the first adhesive-free region 5. Disconnecting oriented polymer layer 8 and 9 from the rest of the flexible laminate 1 by a score line 15 situated at the edges of the adhesive-free region 5 results in the formation of an inflatable outlet tube 13 having two outlet openings 17 as illustrated in FIG. 11.

Figure 7:
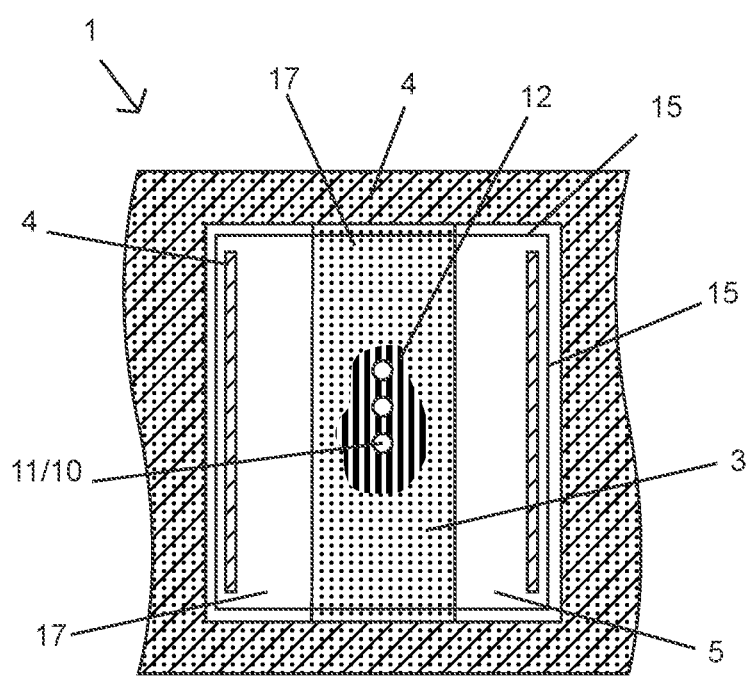
FIG. 7 represents a top view of the flexible multilayer laminate comprising the valve region, wherein the first adhesive-free region is "II"-shaped and the inflatable outlet tube is a straight outlet tube with two outlet openings.

Referring to still another exemplary embodiment of the present disclosure, as illustrated in FIG. 7, the first adhesive-free region 5 is "Π"-shaped (parallel strips). A second oriented polymer layer 9 is then laminated to the first oriented polymer layer 8 over the entire extension of the laminate via a second adhesive pattern 4, with the exception of the location corresponding to adhesive-free region 5, where the second adhesive pattern 4 is limited to two parallel zones applied on the first oriented polymer layer 8 on the outer edges within each strip corresponding to the first adhesive-free region 5. Disconnecting oriented polymer layer 8 and 9 from the rest of the flexible laminate 1 by a score line 15 situated at the edges of the adhesive-free region 5 results in an inflatable outlet tube 13 having two outlet openings 17, as illustrated in FIG. 11.

Figure 8:
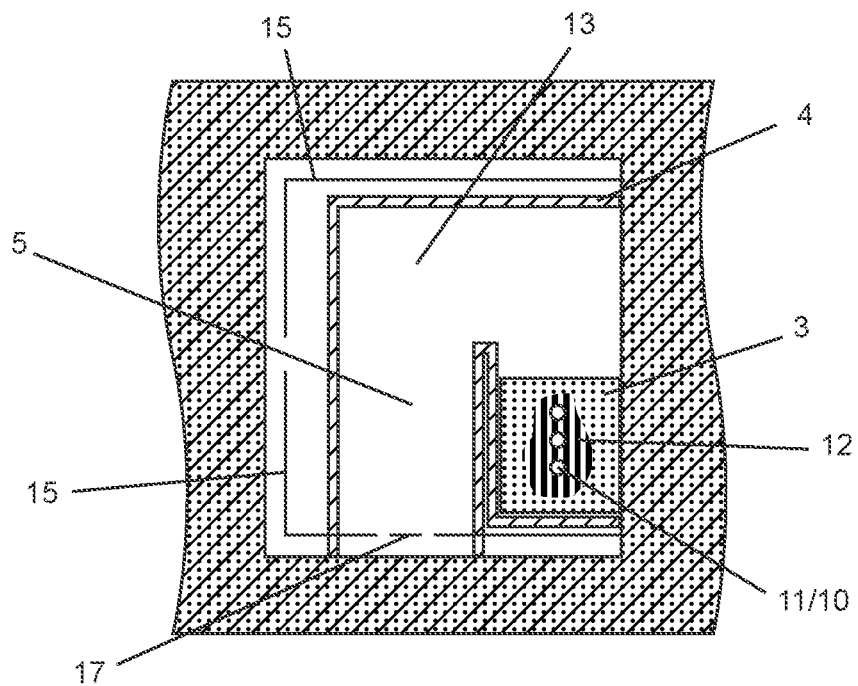
FIG. 8 represents a top view of the flexible multilayer laminate comprising the valve region wherein the first adhesive-free region is "⊔"-shaped and the inflatable outlet tube is "U"-shaped with one outlet opening.
Figure 9:
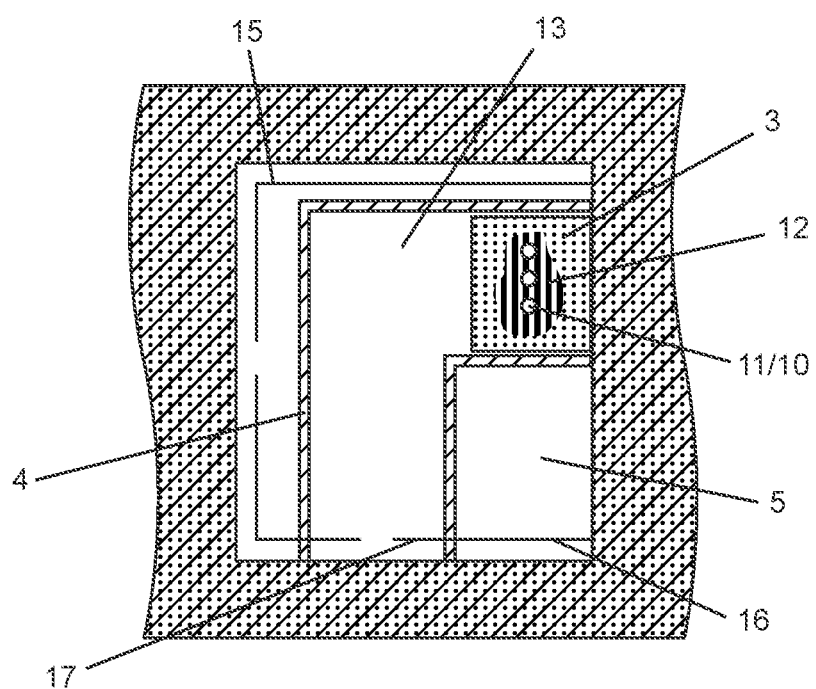
FIG. 9 represents a top view of the flexible multilayer laminate comprising the valve region wherein the first adhesive-free region is "⊔"-shaped and the inflatable outlet tube is "L"-shaped with one outlet opening.

Referring to a preferred embodiment of the present disclosure, as illustrated in FIG. 2, FIG. 8 and FIG. 9, a plurality of perforations 11 is provided through the first oriented polymer layer 8, the first adhesive pattern 3, comprising a "⊔"-shaped (U-type) first adhesive-free region 5.

At the location of the perforations 11, a cavity 10 is provided through the first oriented polymer layer 8 and the first adhesive layer 3.

A second oriented polymer layer 9 is then laminated to the first oriented polymer layer 8 over the entire extension of the laminate via a second adhesive pattern 4, with the exception of the adhesive-free region 5 wherein the second adhesive pattern is of the shape as to result in an inflatable tube 13 in the L-shape, the ⊔-shape or any intermediate shape. The inflatable outlet tube 13 comprises one outlet opening 17.

The one-way pressure-release valve 2 of the present disclosure preferably has a straight square or rectangular-shape, more preferably an L-shape, a ⊔-shape or any intermediate shape thereof with side lengths independently comprised between 10 and 70 mm, and preferably between 15 and 50 mm.

The first adhesive-free region 5 according to the present disclosure is preferably "⊔"-shaped (U-type), "Π"-shaped (parallel strips), or square- or rectangular frame shaped with side lengths independently comprised between 10 and 70 mm, and preferably between 15 and 50 mm.

The first 8 and second 9 oriented polymer layers are independently selected from the group consisting of oriented polyester, oriented polypropylene and oriented polyamide.

In a particular embodiment, the oriented polymer layer 8 comprises a barrier layer such as a metallized layer, an aluminum layer, a silicon oxide or aluminum oxide layer or an ethylene vinyl alcohol copolymer (EVOH) coating.

The flexible laminate 1 may comprise any number of layers and is characterized by an overall thickness of the laminate that should be from about 10 μm to about 200 μm, preferably from about 20 μm to about 170 μm, more preferably from about 30 μm to about 150 μm.

The barrier layer 7 comprises polymers selected from the group consisting of ethylene vinyl alcohol, polyvinyl alcohol, polyvinylidene chloride, polyester and combinations thereof. The barrier layer 7 can further be a metallic or a metallization layer.

A metallization layer may be deposited for decreasing oxygen permeability and improving the aesthetic appearance of the flexible laminate 1. The metallization layer preferably comprises aluminum and can be deposited by a vacuum-deposition process.

The seal layer 6 comprises polymers selected from the group consisting of polyethylene, polypropylene, copolymers thereof, and mixtures thereof.

The adhesives comprised in the first adhesive pattern 3 and the second adhesive pattern 4 may be any suitable adhesive; preferred for use herein includes, but is not limited to, pressure-sensitive adhesives such as these based on acrylic copolymers and permanent adhesives such as these based on polyurethanes.

The first 8 and/or second 9 oriented polymer layers are optionally transparent, having a print applied either to that side of the second oriented polymer layer 9 that is laminated to the first oriented polymer layer 8, or to that side of the first oriented polymer layer 8 that is laminated to the underlying layer comprising the barrier layer 7 and the seal layer 6. Reverse printing is preferably used to avoid damage of the print.

Referring to a particular embodiment of the present disclosure, as represented in FIG. 2, FIG. 8 and FIG. 9, part of the score line 15 is interrupted, at least once, at the location corresponding to the outlet opening(s) 17 of the inflatable outlet tube 13 and preferably at the location bordering the outlet tube.

Figure 10:
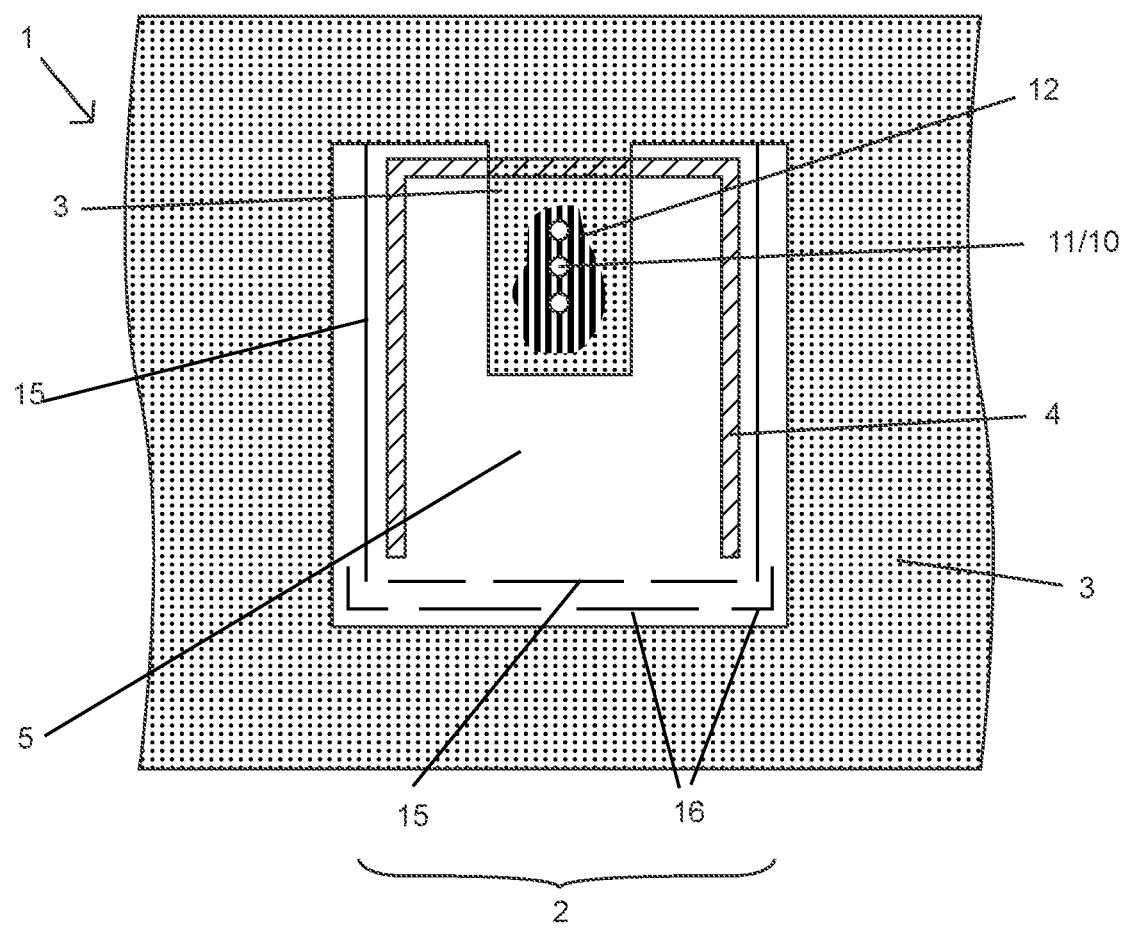
FIG. 10 represents a top view of the flexible multilayer laminate comprising the valve region, wherein the first adhesive-free region is "⊔"-shaped and wherein two parallel, adjacent interrupted score lines are provided.

As represented in FIG. 10, adjacently parallel to the interrupted part of said score line 15, an additional interrupted score line 16 may be applied in such a way that the interruptions of both score lines are alternately positioned.

This particular embodiment comprising interrupting part of score line 15 is applicable for the various types of adhesive-free regions 5, as previously mentioned and for the various shapes of outlet tube.

Interrupted score lines allow for keeping the outlet opening part 17 of the one-way pressure-release valve 2 down to the flexible laminate 1, which is important during the manufacturing process, particularly those where high line speeds are applied, while guaranteeing excellent one-way gas release properties of said valve 2, which nonetheless is not exposed to possible stresses in the rest of the flexible multilayer laminate 1.

The flexible multilayer laminate 1 having an integrated pressure-release valve 2 is prepared according to a method comprising the steps of:
a) providing a first part of the laminate comprising a seal layer 6;
b) applying a first adhesive pattern 3 on said first part of the laminate, said adhesive pattern comprising one or more adhesive-free regions 5 of various shapes;
c) joining a first oriented polymer layer 8 to the first part of the laminate to form the second part of the laminate;
d) perforating said second part of the laminate in the area surrounded by the adhesive-free region(s) 5;
e) scoring a cavity 10 in the first oriented polymer layer 8 and the first adhesive pattern 3 at the location of the perforations 11;
f) applying a second adhesive pattern 4 on the second part of the laminate;
g) applying a liquid 12 on the second part of the laminate at the location of the cavities 10;
h) joining a second oriented polymer layer 9 to the first oriented polymer layer 8 using a second adhesive pattern 4;
i) partly separating the first 8 and the second 9 oriented polymer layer from the surrounding multilayer laminate by scoring at the rim of the adhesive-free region 5 to form an inflatable outlet tube 13.

In the embodiment where the second oriented polymer layer 9 is laminated to the first oriented polymer layer 8 over the entire extension of the laminate, partial disconnection is performed by cutting both the first oriented polymer layer 8 and the second oriented polymer layer 9 at the rim of the first adhesive-free region 5.

EXAMPLES

The following illustrative examples are merely meant to exemplify the present disclosure but are not destined to limit or otherwise define the scope of the present disclosure.

Example 1

A laminate was produced by laminating a reverse-printed, coextruded oriented polypropylene film with a thickness of 20 μm (oriented polymer layer 8) to an underlying layer comprising a metallized, oriented polyethylene terephthalate film with a thickness of 12 μm (barrier layer 7) and a polyethylene film having a thickness of about 85 μm (seal layer 6) via a first adhesive pattern 3 comprising a first "⊔"-shaped (U-type) adhesive-free region 5. The "⊔"-shaped adhesive-free region 5 can be visualized as being a rectangle with sides of 15 to 50 mm, comprising a central 5 to 20 mm rectangular adhesive-comprising protruding region, wherein the 5 mm side of the adhesive-comprising protruding region is tangent to, and centered on the 15 mm side of the of the 15 to 50 mm adhesive-free rectangle.

A plurality of perforations 11 was provided through said laminate at the location of said 5 to 20 mm adhesive-comprising protruding region. The plurality of perforations 11 was provided around the center of the adhesive-comprising protruding region, at such a location that it was completely surrounded by adhesive.

At the location of each perforation 11, a cavity 10 is scored in the oriented polypropylene film (oriented polymer layer 8) and the first adhesive pattern 3.

A second adhesive pattern 4 was provided covering the entire extension of the laminate with the exception of the "⊔"-shaped adhesive-free region 5, where the second adhesive pattern 4 was limited to an "Π"-shaped (inverse U-type) adhesive pattern, provided along the edge of three sides (50-15-50 mm, wherein the adhesive-comprising protruding region is tangent to said 15 mm side) of the rectangular first adhesive-free region 5. The "Π"-shaped pattern was about 2 mm wide, with the legs of the "Π" being 17 mm and wherein the base was 12 mm. The base of the "Π" was centrally disposed with respect to the 15 mm side, comprising the central adhesive-comprising protruding region, of the "⊔"-shaped adhesive-free region 5.

A silicone oil with a dynamic viscosity of 1000 cP was provided at the location of the plurality of perforations 11 comprising cavities 10.

A reverse-printed, coextruded oriented polypropylene film with a thickness of 20 μm (oriented polymer layer 9) was laminated to the laminate via the second adhesive pattern 4.

Valve region 2 was partly disconnected from the rest of the laminate by laser cutting the oriented polymer layers 8 and 9 along the edges of the "⊔"-shaped adhesive-free region 5, at the outside of the "Π"-shaped (inverse U-type) adhesive pattern 4, wherein the score line at the location of the outlet of the outlet tube is interrupted twice.

The one-way valve produced in Example 1 had a minimum opening pressure of about 900 Pa.

Example 2

A laminate was produced by laminating a reverse-printed, oriented polyester film with a thickness of 12 μm (oriented polymer layer 8) to an underlying layer comprising a 9 μm aluminum layer (barrier layer 7) and a polyethylene film having a thickness of about 70 μm (seal layer 6) via a first adhesive pattern 3 comprising a first ⊔-shaped (U-type) adhesive-free region 5. The ⊔-shaped adhesive-free region 5 can be visualized as being a square with sides of 40 to 40 mm, comprising a central adhesive-comprising protruding region in the form of a square with dimensions 10 to 10 mm, wherein the 10 mm side of the adhesive-comprising protruding region is tangent to, and centered on the 40 mm side of the of the 40 to 40 mm adhesive-free square.

A plurality of perforations was provided as in the adhesive comprising protruding region and at the location of each perforation 11, a cavity 10 is scored in the oriented polyester film (oriented polymer layer 8) and the first adhesive pattern 3.

A second adhesive pattern 4 was provided covering the entire extension of the laminate with the exception of the "⊔"-shaped adhesive-free region 5, where the second adhesive pattern 4 was limited to a pattern intermediate to a double L-shaped and a double ⊔-shaped pattern, as represented in FIG. 2, wherein the two parallel adhesive pattern lines of 2 mm width, were 10 mm away from each other, wherein part of the parallel lines surrounds the protruding adhesive region comprising the perforations and wherein the remaining parallel lines are about 10 mm away from the rim of the adhesive-free region 5 and end-up at the rim of the adhesive-free region 5. An additional adhesive line linking the parallel lines at the location of the perforation results in the formation of an outlet tube.

Valve region 2 was disconnected from the rest of the laminate by laser cutting the oriented polymer layers 8 and 9 along the edges of the "⊔"-shaped adhesive-free region 5, at the outside of the adhesive pattern 4 and crossing the two parallel adhesive lines perpendicularly ending-up at the rim of the adhesive-free region 5, as represented in FIG. 2.

The score line at the location of the outlet opening 17 of the outlet tube 13 was interrupted twice. The score line opposite the adhesive comprising protruding region was interrupted once and an additional interrupted score line was provided adjacently parallel to said interrupted score line; the additional sore line was interrupted once.

The one-way valve produced in Example 2 had a minimum opening pressure of about 600 Pa.

For the determination of the minimum opening pressure, the pressure difference was measured over the valve for a gas flow of 16 cm$^3$/min.

The invention claimed is:

1. A flexible multilayer laminate for forming a packaging of gas-releasing products, the multilayer laminate comprising:
   a pressure-release valve, the pressure-release valve integrated into the multilayer laminate and having open and closed orientations, the pressure-relief valve further comprising:
   a first oriented polymer layer;
   a first adhesive pattern, the first adhesive pattern sealing the first oriented polymer layer on an underlying layer, the first adhesive pattern comprising first adhesive-free regions located around or on at least both sides of an at least one inlet perforation;
   the underlying layer comprising a seal layer;
   the at least one inlet perforation through the underlying layer and in gaseous communication with a cavity;
   the cavity integrated within the first oriented polymer layer and the first adhesive pattern, wherein the cavity is positioned at a contact surface between the underlying layer and the first adhesive layer;
   a liquid, the liquid disposed within the cavity;
   a second oriented polymer layer, the second oriented polymer layer bonded in register to the first oriented polymer layer with a second adhesive pattern, the second oriented polymer layer being perforation free;
   the second adhesive pattern, the second oriented polymer layer, and first oriented polymer layer forming an inflatable outlet tube;
   the inflatable outlet tube in gaseous communication with the cavity, the inflatable outlet tube being partially disconnected from the rest of the laminate by a surrounding outer score line, wherein the inflatable outlet tube is allowed to lift off from the underlying layer under increased pressure in the packaging; and
   wherein the pressure-relief valve is biased between the closed and open orientations to permit gaseous communication in one direction with gas from the packaging entering through the at least one perforation into the cavity, travelling through the liquid, and exiting through the inflatable outlet tube.

2. The flexible multilayer laminate according to claim 1, wherein the surrounding outer score line is interrupted at least once at a location corresponding to the outlet opening(s) of the inflatable outlet tube, and wherein an additional, interrupted score line is provided adjacently parallel to the interrupted part of the surrounding outer score line, the interruptions of both score lines being alternately positioned.

3. The flexible multilayer laminate according to claim 1, wherein the inflatable outlet tube has a shape selected from the group consisting of an "L"-shape, a "U"-shape and an intermediate "L/U"-shape, and wherein the at least one perforation in gaseous communication with the cavity and liquid is shifted away from an outlet opening of the inflatable outlet tube.

4. The flexible multilayer laminate according to claim 1, wherein an opening pressure of the pressure-release valve is lower the 1500 Pa.

5. The flexible multilayer laminate according to claim 1, wherein each of the first and the second oriented polymer layers are independently selected from the group consisting of oriented polyester, oriented polypropylene, and oriented polyamide.

6. The flexible multilayer laminate according to claim 1, wherein each of the first and the second oriented polymer layers comprise a barrier including a metallized layer, an aluminum layer, a silicon oxide or aluminum oxide layer, or an ethylene vinyl alcohol copolymer (EVOH) coating.

7. The flexible multilayer laminate according to claim 1, wherein the liquid is selected from the group consisting of silicon oil, hydrocarbon oil, vegetable oil, and water.

8. The flexible multilayer laminate according to claim 1, wherein the liquid has a dynamic viscosity, at room temperature, comprised between 1 cP and 15000 cP.

9. The flexible multilayer laminate according to claim 1, wherein an off-gassing flow capacity of the pressure-release valve is higher than 5 cm$^3$/min.

10. The flexible multilayer laminate according to claim 1, comprising a second integrated pressure-release valve.

11. The flexible multilayer laminate according to claim 1, comprising up to 12 of the integrated pressure-release valves, in the width of the laminate.

12. A packaging comprising a flexible multilayer laminate according to claim 1.

13. The flexible multilayer laminate according to claim 1, wherein the first or the second oriented polymer layer comprises a barrier including a metallized layer, an aluminum layer, a silicon oxide or aluminum oxide layer, or an ethylene vinyl alcohol copolymer (EVOH) coating.

14. The flexible multilayer laminate according to claim 2, wherein the inflatable outlet tube has a shape selected from the group consisting of an "L"-shape, a "U"-shape and an intermediate "L/U"-shape, and wherein the perforations with the cavity comprising liquid are shifted away from the outlet opening.

15. The flexible multilayer laminate according to claim 2, wherein an opening pressure of the pressure-release valve is lower than 1500 Pa.

16. The flexible multilayer laminate according to claim 2, wherein the first and second oriented polymer layers are independently selected from the group consisting of oriented polyester, oriented polypropylene, and oriented polyamide.

17. The flexible multilayer laminate according to claim 2, wherein the first and second oriented polymer layers each comprise a barrier including a metallized layer, an aluminum layer, a silicon oxide or aluminum oxide layer, or an ethylene vinyl alcohol copolymer (EVOH) coating.

18. The flexible multilayer laminate according to claim 2, wherein the first or the second oriented polymer layer comprises a barrier including a metallized layer, an aluminum layer, a silicon oxide or aluminum oxide layer, or an ethylene vinyl alcohol copolymer (EVOH) coating.

19. The flexible multilayer laminate according to claim 3, wherein the first oriented polymer layer comprises a barrier including a metallized layer, an aluminum layer, a silicon oxide or aluminum oxide layer, or an ethylene vinyl alcohol copolymer (EVOH) coating.

* * * * *